(12) United States Patent
Romig

(10) Patent No.: US 8,373,375 B2
(45) Date of Patent: Feb. 12, 2013

(54) ELECTRO-MECHANICAL DRIVE WITH EXTENDED CONSTANT POWER SPEED RANGE

(75) Inventor: Bernard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 313 days.

(21) Appl. No.: 12/896,486

(22) Filed: Oct. 1, 2010

(65) Prior Publication Data

US 2012/0081059 A1   Apr. 5, 2012

(51) Int. Cl.
*H02P 5/00*    (2006.01)
*H02P 7/00*    (2006.01)
*H02P 7/29*    (2006.01)

(52) U.S. Cl. ......... 318/491; 318/293; 318/466; 388/819

(58) Field of Classification Search .................. 318/293, 318/466, 491; 388/819
See application file for complete search history.

(56) References Cited

U.S. PATENT DOCUMENTS

| | | | |
|---|---|---|---|
| 3,735,217 A | 5/1973 | Kilgore et al. | |
| 4,000,662 A | 1/1977 | Wolfe | |
| 4,561,325 A | 12/1985 | Jester | |
| 4,760,314 A * | 7/1988 | Mohri et al. | 318/78 |
| 7,081,725 B2 * | 7/2006 | Seely et al. | 318/139 |
| 7,125,362 B2 | 10/2006 | Beaty et al. | |
| 7,479,081 B2 * | 1/2009 | Holmes | 475/5 |
| 7,559,864 B2 * | 7/2009 | Maeda et al. | 475/5 |
| 7,803,085 B2 | 9/2010 | Himmelmann | |
| 8,123,655 B2 | 2/2012 | Endo | |
| 8,133,150 B2 * | 3/2012 | Rogg | 477/3 |
| 2002/0063000 A1 * | 5/2002 | Kojima | 180/65.1 |
| 2005/0164827 A1 | 7/2005 | Beaty et al. | |
| 2008/0318730 A1 | 12/2008 | Endo | |
| 2009/0019967 A1 | 1/2009 | Himmelmann | |
| 2009/0075779 A1 * | 3/2009 | Kumazaki et al. | 477/3 |
| 2010/0197449 A1 * | 8/2010 | Imamura et al. | 477/3 |

FOREIGN PATENT DOCUMENTS

| | | |
|---|---|---|
| GB | 757515 | 9/1956 |
| WO | 03062009 A1 | 7/2003 |

OTHER PUBLICATIONS

EP Search Report dated Jun. 29, 2012 regarding application 11183005.5-1254/2436950, applicant's reference 18061 EP La/Gh, Applicant Deere & Company, 6 pages.

* cited by examiner

*Primary Examiner* — Walter Benson
*Assistant Examiner* — Gabriel Agared
(74) *Attorney, Agent, or Firm* — Yee & Associates, P.C.; Jeremy J. Westlake

(57) ABSTRACT

Embodiments of the invention comprise a multi-input range box driven by multiple electric drives. Range shifting involves momentarily increasing the current through all but a given motor, to a level that will carry the entire load, comprising specified constant power. Simultaneously, torque of the given motor is reduced to zero. The given motor is then disconnected from supplying power, is synchronized to the input speed of the new speed range, and is then engaged for the new range. The above sequence is then repeated for each remaining motors, in turn. The motor current is re-equalized for all of the motors, after all the motors have been connected to provide power at the new range. Thus, there is no interruption in power flow during a range shift, and the motors are always used to deliver power, rather than to serve as a brake.

20 Claims, 5 Drawing Sheets

000# ELECTRO-MECHANICAL DRIVE WITH EXTENDED CONSTANT POWER SPEED RANGE

FIELD OF THE INVENTION

The invention disclosed and claimed herein generally pertains to an electro-mechanical drive that is capable of providing a constant level or amount of output power, over an extended range of speed. More particularly, the invention pertains to a drive of the above type that reduces complexity, in comparison with other approaches that are currently used to extend speed range at constant power.

BACKGROUND OF THE INVENTION

At present, variable speed or adjustable speed electric drives are available that comprise an inverter and an electric motor. However, the speed range of a drive of this type, over which the drive can provide constant power, tends to be quite limited. Efforts to increase this speed range have resulted in systems which are heavy, costly, and inefficient.

Some hydrostatic drives, which consist of a hydraulic pump and a hydraulic motor, have been used for the above purpose. Use of electro-mechanical devices, however, to achieve constant power over a greater speed range, has generally not been successful. For example, difficulty has been encountered in sustaining high holding torques at speeds which are close to zero. In an alternative approach, which uses a range box driven by an electric drive, it has proved difficult to achieve seamless range shifts.

SUMMARY

Useful embodiments of the invention comprise a multi-input range box driven by two or more identical electric drives. Range shifting is accomplished by momentarily increasing the current through all but a given one of the motors, to a level that will carry the entire load, while simultaneously reducing the torque of the given motor to zero. The given motor is then disconnected from supplying power, such as by moving an associated shift collar to a neutral position. The disconnected motor is synchronized to the input speed of the new speed range, and the shift collar engages the given motor to supply power for this range. The above sequence is then repeated for each remaining motor, in turn. The motor current is re-equalized for all of the motors, after all the motors have been connected at the new range, so that the motors provide an equal share of the needed torque. Thus, there is no interruption in power flow during a range shift, and the motors are always used to deliver power, rather than to serve as a brake.

In one embodiment of the invention, apparatus is provided in an electro-mechanical drive system that includes a movable power output component, and further includes a plurality of electric drive motors. The apparatus comprises a first transfer mechanism that is connectable to and disconnectable from each of the motors, for transferring power from each connected motor to cause the output component to move at a first speed relative to the motor speed, comprising a first speed ratio, and to deliver power at a specified constant level when moving at the first speed ratio. The apparatus further comprises a second transfer mechanism that is connectable to and disconnectable from each of the motors, for transferring power from each connected motor to cause the output component to move at a second speed relative to the motor speed, comprising a second speed ratio, and to deliver power at the same specified constant level when moving at the second speed ratio. A shift means is provided, for selectively connecting each motor to and disconnecting each motor from the first and second transfer mechanisms, respectively. A current source selectively supplies electric current to each motor, and a control device is connected to perform a sequence of tasks, at a time when each of the motors are simultaneously connected to the first transfer mechanism. The set of tasks comprises (a) disconnecting a selected one of the motors from the first transfer mechanism, while at the same time supplying increased electric current to each remaining motor, to maintain movement of the output component at the first speed and delivery of power thereby at the specified constant level; (b) bringing the speed of the selected motor to a synchronized speed associated with the second speed; and (c) responsive to the selected motor reaching the synchronized speed, connecting the selected motor to the second transfer mechanism. The tasks (a)-(c) are then performed sequentially on each of the other motors, after which the motor currents are equalized.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
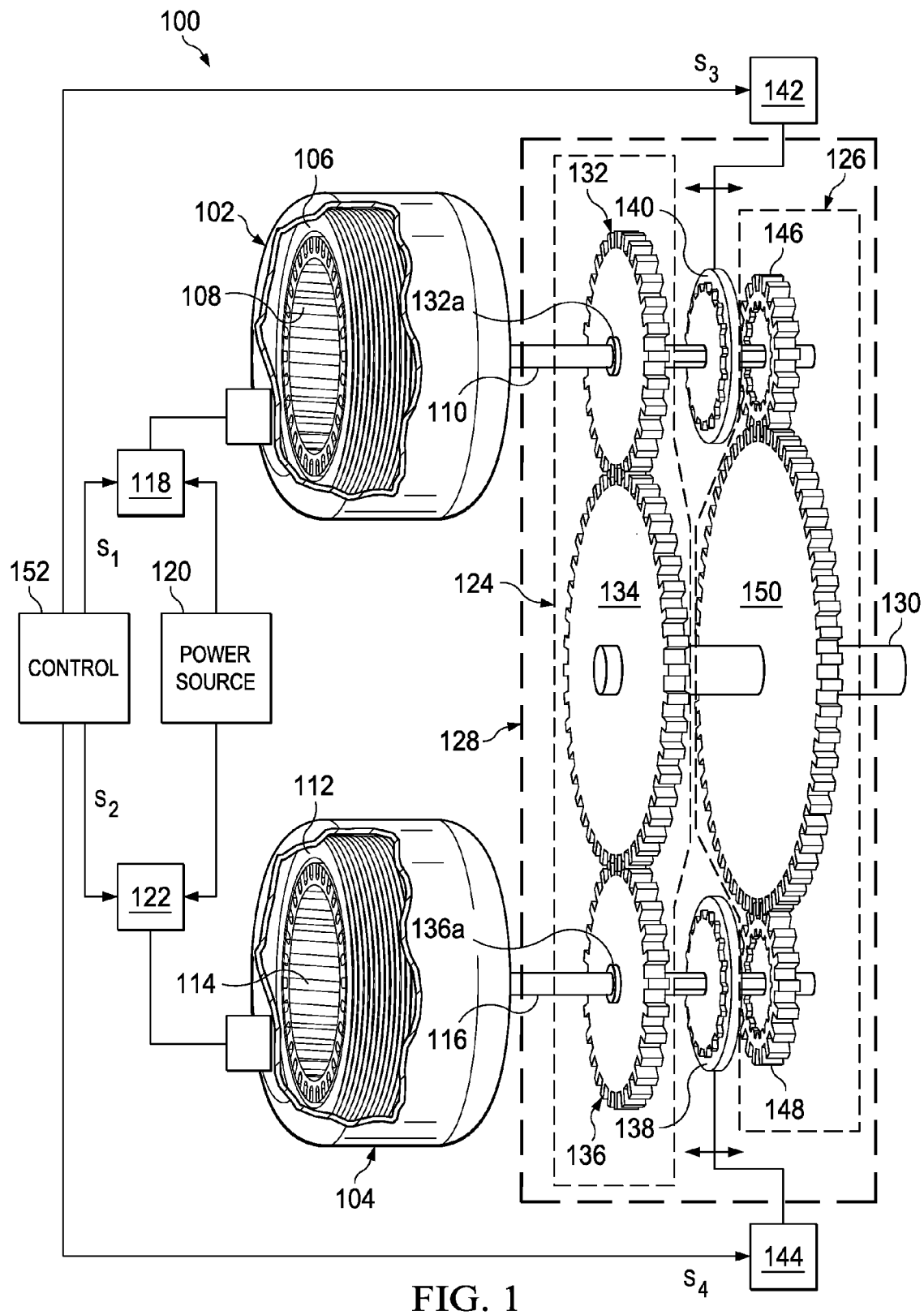
FIG. 1 is a simplified perspective view depicting an embodiment of the invention.

Referring to FIG. 1, there is shown a mechanical drive system 100 comprising an embodiment of the invention. System 100 includes two variable speed electric drive motors 102 and 104, which usefully are identical to each other. Motor 102 comprises a stator 106, a rotor 108, and an output drive shaft 110, which is driven by rotor 108 to rotate at varying speeds. Motor 104 similarly comprises a stator 112, a rotor 114, and an output drive shaft 116, which is driven by rotor 114 to rotate at varying speeds. In an exemplary embodiment, the electric drive motors have a constant power speed range of six, but the invention is not limited thereto.

In a useful embodiment of the invention, drive motors 102 and 104 each comprises an AC motor, wherein motor speed is controlled by a variable frequency inverter. More particularly, the inverter controls the frequency and current of the power which is supplied to its motor. Accordingly, FIG. 1 shows a variable frequency inverter 118 connected to control the power supplied to stator 106 of motor 102, from a power source 120. Similarly, a variable frequency inverter 122 is connected to control power supplied to stator 112 of motor 104 from the power source 120. FIG. 1 further shows a control 152 connected to provide control signals $S_1$ and $S_2$ to inverters 118 and 122, respectively. By means of these control signals, control 152 is able to use the inverters to control the operation of motors 102 and 104 in implementing an embodiment of the invention, as described hereinafter in further detail. Of course, other types of motors and motor controls, as are known to those of skill in the art, could alternatively be used.

Referring further to FIG. 1, there is shown drive shaft 110 of motor 102, and drive shaft 116 of motor 104, that are both connected to two sets of gears. These two gear sets comprise power transfer mechanisms 124 and 126, respectively, with both power transfer mechanisms contained in a range box 128 or the like. Each of the power transfer mechanisms is mounted to transfer power from drive shafts 110 and 116, in order to rotatably drive an output shaft 130. More particularly, transfer mechanism 124 is configured to drive output shaft 130 at a rotary speed that is significantly higher than the speed at which transfer mechanism 126 drives the output shaft 130. Moreover, when output shaft 130 is driven by either power transfer mechanism 124 or 126, output shaft 130 delivers a level or amount of power which is constant, i.e., a power level that is the same when operating through either transfer mechanism, and at either of their respective speeds.

FIG. 1 further shows power transfer mechanism 124 comprising gears 132, 134 and 136, wherein gear 134 is fixably joined to output shaft 130, to rotate therewith. Gear 132 is carried on motor drive shaft 110, by means of rotary bearings 132*a*, and is meshed or engaged to gear 134. Gear 136 is carried on motor drive shaft 116, by means of rotary bearings 136*a*, and is likewise meshed or engaged to gear 134. Thus, gears 132 and 136 are constrained to always move with gear 134. Also, gears 132 and 136 will rotate freely upon drive shafts 110 and 116, by means of their rotary bearings, unless these gears are locked to their respective shafts 110 and 116. When such locking occurs, rotary power, provided by the corresponding drive shafts 110 and/or 116, will be applied through gears 132 and/or 136, to rotatably drive gear 134. This in turn will cause output shaft 130 to be driven at its higher speed.

In an analogous configuration, power transfer mechanism 126 comprises gears 146, 148 and 150, wherein gear 150 is fixably joined to output shaft 130, to rotate therewith. Gear 146 is carried on motor drive shaft 110, by means of rotary bearings (not shown), and is meshed or engaged to gear 150. Gear 148 is carried on motor drive shaft 116, by means of rotary bearings (not shown), and is likewise meshed or engaged to gear 150. Thus, gears 146 and 148 are constrained to always move with gear 150. Also, gears 146 and 148 will rotate freely upon drive shafts 110 and 116, by means of their rotary bearings, unless these gears are locked to their respective shafts 110 and 116. When this occurs, rotary power, provided by the corresponding drive shafts 110 and/or 116, will be applied through gears 146 and/or 148 to rotatably drive gear 150. This will cause output shaft 130 to be driven at its lower speed.

In order to selectively lock gears 132 and 136 to their respective drive shafts, a shift collar device 140 is mounted on drive shaft 110, and a shift collar 138 is mounted on drive shaft 116. As discussed hereinafter in further detail, the shift collar 140 has splines (not shown in FIG. 1) which engage slots (not shown in FIG. 1) that are formed in shaft 110. Thus, shift collar 140 is constrained to rotate with shaft 110. At the same time, shift collar 140 can be moved along shaft 110 and the slots therein, between a neutral position, a position at which shift collar 140 engages gear 132, and a position at which shift collar 140 engages gear 146. Movement of shift collar 140 is controlled by an actuator 142, which is operated by control signals $S_3$ received from control 152. Thus, when shift collar 140 is in its position to engage gear 132, power transfer mechanism 124 is connected to receive power from drive shaft 110 of motor 102, in order to drive output shaft 130. Power transfer mechanism 124 is disconnected from shaft 110, when shift collar 140 is in either of its other positions.

By a similar arrangement, a shift collar 138, which is substantially identical to shift collar 140, is constrained to rotate with drive shaft 116. An actuator 144, responsive to control signals $S_4$ received from control 152, is operable to move shift collar 138 between a neutral position, a position at which it engages gear 136, and a position at which it engages gear 148. When shift collar 138 engages gear 136, power transfer mechanism 124 is connected to receive power from drive shaft 116 of motor 104, to drive output shaft 130. Power transfer mechanism 124 is disconnected from shaft 116, when shift collar 138 is at its other positions.

From the above, it will be appreciated that power transfer mechanism 124 can receive power to drive output shaft 130 from drive shaft 110 of motor 102, from driveshaft 116 of motor 104, or from both drive shafts at the same time, as is respectively determined by operation of shift collars 138 and 140, and actuators 142 and 144. Moreover, power transfer mechanism 124 can be disconnected from both drive shafts 110 and 116, by operation of the shift collars and actuators.

It will be appreciated further that power transfer mechanism 126 can similarly be connected to receive power from either or both drive shafts 110 and 116, by selective operation of the shift collars and actuators. More particularly, gear 146 will be connected to drive shaft 110 when gear 146 is engaged by shift collar 140, and gear 148 will be connected to driveshaft 116 when gear 148 is engaged by shift collar 138. Output shaft 130 will then be driven at its lower speed, by either one or both of the motors 102 and 104.

In a normal mode of operation of the system 100, motors 102 and 104 are operated together to drive output shaft 130. Both motors are supplied with the same amount of current, so that they provide equal torque. The output shaft will rotate at either its high speed or its low speed, according to whether power is supplied thereto through transfer mechanism 124 or 126, respectively. The power provided by the motors is selected to ensure that output shaft 130 continuously delivers a specified constant level of output power, that is, an amount of power which remains the same at both the faster and slower output speeds of shaft 130.

In accordance with an embodiment of the invention, a set or sequence of tasks is performed, in order to shift from a normal mode of operation of system 100 at one speed to a normal mode of operation at the other speed. At least one of the motors is always delivering power during this transition, so that there is no interruption in power flow. A first task (1) in the speed range transition, such as from high speed operation using transfer mechanism 124 to low speed operation using transfer mechanism 126, comprises initially increasing the current to one of the motors, such as motor 104. More particularly, the current is increased so that motor 104 will produce sufficient torque to carry the entire load, that is, the load of output shaft 130 at high speed and the specified constant power. Task (1) further comprises, simultaneously with increasing the current to motor 104, turning off the current to motor 102 for a brief time, to reduce the torque provided by motor 102 and its drive shaft 110 to zero. It will be seen that control 152 can readily implement task (1) by means of inverters 118 and 122 and power source 120.

Task (2) is performed when the torque of motor 102 reaches zero, wherein task (2) comprises disconnecting drive shaft 110 from transfer mechanism 124. In system 100, this could be implemented simply by actuating shift collar 140 to move to its neutral position, to thereby disengage gear 132 from shaft 110.

Following the disconnecting task (2), a task (3) is performed, which comprises supplying motor 102 with current that is sufficient to bring drive shaft 110 to a speed that is synchronized with slow speed operation of system 100. This would be the speed at which drive shaft 110 would normally operate, when supplying power to output shaft 130 through the slow speed mechanism 126. Task (3) could also be implemented by inverter 118 and power source 120. When drive shaft 110 reaches the synchronized speed, task (4) is performed. In accordance with task (4), control 152 directs shift collar 140 to engage gear 146, so that shaft 110 is connected to supply power through transfer mechanism 126 to shaft 130.

After the above sequence of tasks (1)-(4) has been completed, substantially the same sequence is performed to transition drive shaft 116 of motor 104 into connection with power transfer mechanism 126, from its prior connection to power transfer mechanism 124. However, the load at task (1) would now be constant power at low speed, and motor 102 would receive increased current to carry this load. After this second sequence of tasks has been carried out, control 152 is operated to ensure that equal current is supplied to both motors 102 and 104, so that the two motors provide the same amounts of torque, and carry the load equally. System 100 then proceeds to operate in its normal mode, at the new speed.

It is anticipated that embodiments of the invention such as FIG. 1 could provide constant power at a speed range of one to thirty, but the invention is not limited thereto.

Figure 2:
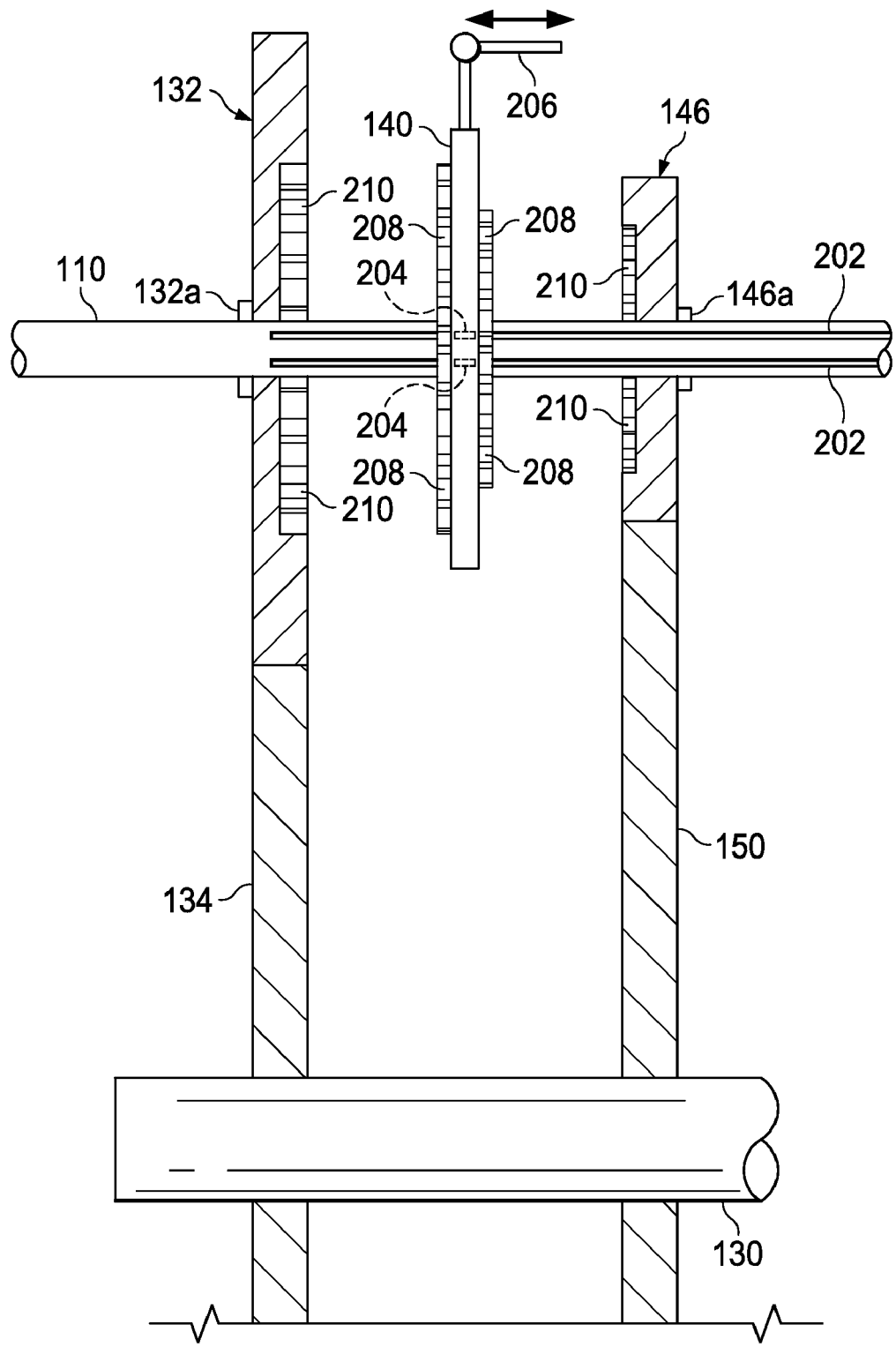
FIG. 2 is a simplified orthogonal view showing a shifting mechanism for the embodiment of FIG. 1.

Referring to FIG. 2, there is shown shift collar 140 of FIG. 1. More particularly, there is shown shift collar 140 together with drive shaft 110, gears 132 and 134 of power transfer mechanism 124, gears 146 and 150 of power transfer mechanism 126, and output shaft 130. FIG. 2 further shows slots 202 formed along shaft 110, between gears 132 and 146, for respectively receiving splines 204 fixed to shift collar 140. Shift collar 140 is thereby constrained to rotate with shaft 110. At the same time, shift collar 140 is able to move longitudinally along shaft 110, between gears 132 and 146.

FIG. 2 shows shift collar 140 in a neutral position, wherein it is not engaged to either gear 132 or 146. As described above, this allows gear 132 to rotate freely with respect to shaft 110 on rotary bearings 132a, and allows gear 146 to rotate freely with respect to shaft 110 on bearings 146a. However, responsive to operation of actuator 142, a gear selector fork 206 or the like can move shift collar 140 along shaft 110 toward gear 132, so that teeth or other elements 208 of shift collar 140 will be inserted into holes or recesses 210 provided in gear 132. Gear 132 will thereby become constrained to rotate with shaft 110, and drive output shaft 130 through gear 134.

In another mode of operation, actuator 142 could operate gear selector fork 206 to move shift collar 140 along shaft 110 toward gear 146, so that teeth or other elements 208 of the shift collar will be inserted into holes or recesses 210 provided in gear 146. Gear 146 will thereby become constrained to rotate with shaft 110, and drive output shaft 130 through gear 150.

It is anticipated that those of skill in the art will be able to configure other sets of gears besides those described above, provided the following Rules (1) and (2) are observed. Rule (1) requires that the ratio of the maximum constant power motor speed to the minimum constant power motor speed must be larger than the ratio step of the mechanical transmission. The overall constant power speed range is the product of these two ratios, while a "don't care" range is given by the motor speed ratio divided by the ratio step. Rule (2) requires that the "don't care" range must be wide enough to allow adequate time to complete the range shift when the load accelerates through the "don't care" range in minimum time. Each motor must go through the following cycle during a range shift: reduce power to zero; shift to neutral; synchronize the motor to the new speed range; shift to the new ratio and pick up its share of the load. Each of the electric drives does this in turn. The time required to reduce the power to zero may be fairly large, since the remaining drives must simultaneously move to an over current condition in order to maintain output power at the rated value.

While not shown, a blocking type synchromesh unit could be used with the shift collar to improve ease of shifting. In the procedure described above for transitioning from one speed to the other, the shift actuator would recognize when the motor current of the disconnected motor shaft is near zero, and the shift collar would be moved through its neutral position to apply a load to the opposite gear. A sensor could detect the time at which the shift collar achieves neutral, and then initiate motor speed correction.

Figure 3:
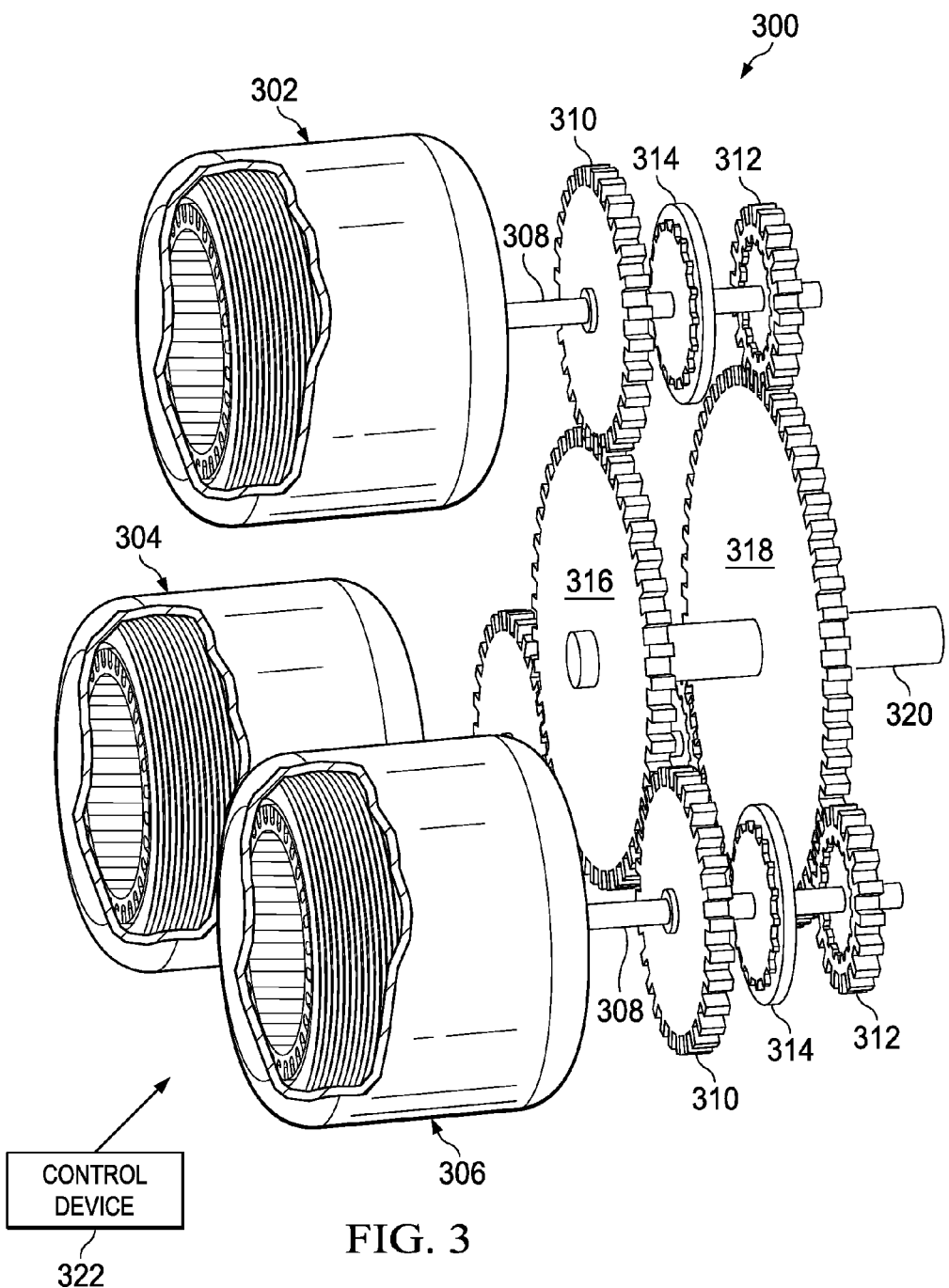
FIG. 3 is a simplified perspective view depicting an embodiment of the invention that comprises three drive motors.

Referring to FIG. 3, there is shown an embodiment of the invention that comprises an electro-mechanical system 300 having three electric drive motors 302, 304 and 306, which usefully are similar or identical to motors 102 and 104 of FIG. 1. Each of the motors 302-306 is provided with a drive shaft 308, and gears 310 and 312 are carried on each shaft 308 by means of rotary bearings (not shown). Thus, each of the gears 310 and 312 is able to rotate freely with respect to its shaft 308, unless one of the gears becomes locked to its shaft. To selectively cause this to happen, a shift collar 314, which may be similar or identical to shift collar 140, is also carried on each shaft, between the gears 310 and 312.

While not shown by the view of FIG. 3, it is to be understood that motor 304 has a drive shaft 308, gears 310 and 312, and a shift collar 314 that are each identical to the corresponding components respectively shown with motors 302 and 306.

Referring further to FIG. 3, there is shown each of the gears 310 meshed or engaged to a gear 316, for rotation therewith. The gears 310 are respectively positioned around gear 316 at 120 degrees from one another. Gear 316 is fixably joined to an output shaft 320, for rotation therewith. Thus, the three gears 310 of motors 302-306, together with gear 316, comprise a high speed power transfer mechanism for supplying power to drive shaft 320.

Similarly, each of the gears 312 are meshed to a gear 318, for rotation therewith. Each of the gears 312 are respectively positioned around gear 318 at 120 degrees from one another. Gear 318 is also fixably joined to output shaft 320, for rotation therewith. Thus, the three gears 312, together with gear 318, comprise a low speed power transfer mechanism, for supplying power to drive shaft 320 at its lower speed.

In a normal mode of operation of the system 300, motors 302-306 are operated together to drive output shaft 320. All three motors are supplied with the same amount of current, so that they provide equal torque. The output shaft 320 will rotate at either its high speed or its low speed, according to whether power is supplied thereto through the high speed or low speed transfer mechanism, respectively. The power provided by the motors is selected to ensure that output shaft 320 continuously delivers a specified constant level of output power, which remains the same at both the faster and slower speeds of shaft 320.

In the embodiment of FIG. 3, substantially the same sequence of tasks (1)-(4) as described above in connection with FIG. 1 is performed to shift from one speed of operation to the other speed. FIG. 3 shows a control device 322 for implementing this sequence of tasks. Usefully, control device 322 would carry out the tasks by operating a power source, inverters and shift collar actuators that are respectively similar, analogous or identical to power source 120, inverters 118 and 122 and actuators 142 and 144 of FIG. 1. For simplification, these components for system 300 are not shown.

In carrying out task (1) for system 300, for example to transit from high speed to low speed operation, the current would be increased to both motors 304 and 306, so that the two motors together would produce enough torque to carry the entire load. Simultaneously, the torque of motor 302 would be reduced to zero, by removing the current therefrom. When motor 302 reaches zero torque, task (2) is carried out by disconnecting the drive shaft 308 of motor 302 from its gear 310 of the high speed transfer mechanism. Then, in accordance with task (3), motor 302 is supplied with current to bring its shaft 308 to the synchronized speed for slow speed operation of system 300. Upon reaching the synchronized speed, shaft 308 of motor 302 is connected to its low speed gear 312, in accordance with task (4).

After completing the tasks (1)-(4) to transition motor 302 from high speed to low speed operation, the tasks (1)-(4) are again performed to transition motor 304 from high speed to low speed operation. Then, substantially the same sequence of tasks is carried out yet again to transition motor 306 from high speed to low speed operation. After each of the motors is operating at the new speed range, control device 322 is operated to ensure that equal current is supplied to each of the motors 302-304, so that the three motors carry the load equally. System 300 then proceeds to operate in its normal mode at the new speed.

An important benefit of the embodiment of FIG. 3, over the embodiment of FIG. 1, is that two motors are available to carry the load during a range transition, rather than just one motor. This substantially relieves current requirements for the inverters used to control each motor. Also, in the above procedure it is anticipated that the time required to transition between normal mode operation at different speeds will be short enough to avoid any significant disruptions in system operation.

Figure 4:
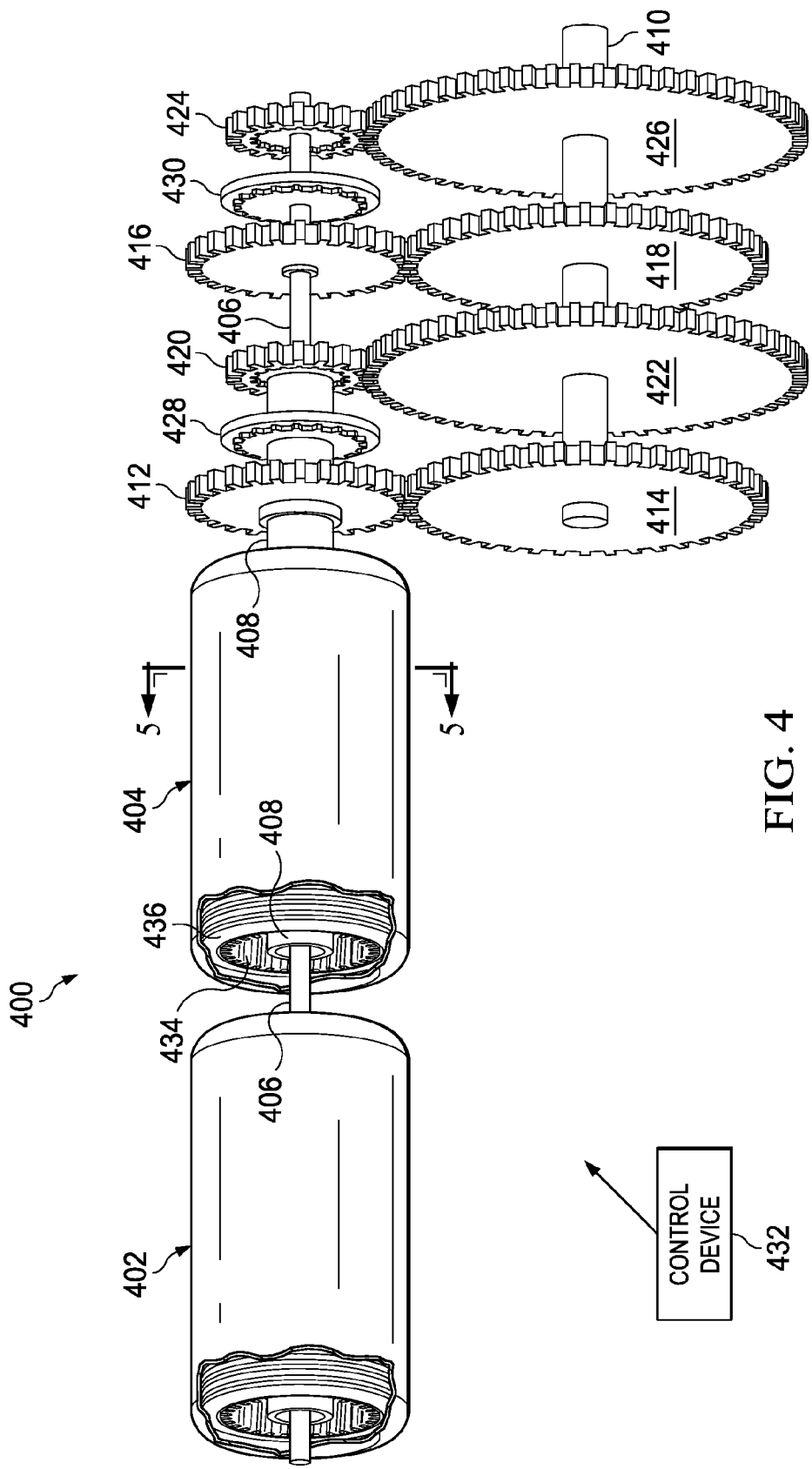
FIG. 4 is a simplified perspective view depicting an embodiment of the invention that comprises two elongated drive motors which are aligned coaxially.

Referring to FIG. 4, there is shown an electro-mechanical system 400 comprising a further embodiment of the invention. System 400 includes two elongated variable speed drive electric motors 402 and 404. Motor 402 has a drive shaft 406, and motor 404 has a drive shaft 408, wherein the two drive shafts are coaxial with one another, or aligned along the same axis. This is achieved by fabricating shaft 406 to be a solid rod of circular cross section. Shaft 408 is formed to be tubular, with an inner diameter sized to allow shaft 406 to be inserted through shaft 408, with adequate clearance being provided between the two shafts. The relationship between shafts 406 and 408 is illustrated further in FIG. 5.

In like manner with the embodiments of FIGS. 1 and 3, system 400 includes two sets of gears, comprising high speed and low speed power transfer mechanisms, respectively, for driving an output shaft 410. The high speed transfer mechanism comprises gears 412, 414, 416 and 418. Gear 412 is mounted on shaft 408 of motor 404 by means of rotary bearings (not shown), and is meshed to move with gear 414, which is fixably joined to rotate with output shaft 410. Gear 416 is mounted on shaft 406 of motor 402 by means of rotary bearings (not shown), and is meshed to move with gear 418, which is also fixably joined to rotate with output shaft 410.

The low speed transfer mechanism comprises gears 420, 422, 424 and 426. Gear 420 is mounted on shaft 408 of motor 404 by means of rotary bearings (not shown), and is meshed to move with gear 422, which is fixably joined to rotate with output shaft 410. Gear 424 is mounted on shaft 406 of motor 402 by means of rotary bearings (not shown), and is meshed to move with gear 426, which is also fixably joined to rotate with output shaft 410.

To connect shaft 408 of motor 404 to supply power to the high speed transfer mechanism, a shift collar 428 is mounted on shaft 408. Shift collar 428 can be actuated to engage gear 412, in the manner described above, whereupon gear 412 becomes locked to rotate with shaft 408. To connect shaft 408 to supply power to the low speed transfer mechanism, shift collar 428 is actuated to engage gear 420. Similarly, to connect shaft 406 of motor 402 to supply power to the high speed transfer mechanism, a shift collar 430 is mounted on shaft 406. Shift collar 430 can be actuated to engage gear 416, whereupon gear 416 becomes locked to rotate with shaft 406. To connect shaft 406 to supply power to the low speed transfer mechanism, shift collar 430 is actuated to engage gear 424.

In a normal mode of operation of the system 400, motors 402 and 404 are operated together to drive output shaft 410. Both motors are supplied with the same amount of current, so that they provide equal torque. The output shaft 410 will rotate at either its high speed or its low speed, according to whether power is supplied thereto through the high speed or low speed transfer mechanism, respectively. The power provided by the motors is selected to ensure that output shaft 410 continuously delivers a specified constant level of output power, which remains the same at both the faster and slower speeds of shaft 410.

In the embodiment of FIG. 4, the same sequence of tasks (1)-(4), as described above in connection with FIG. 1, can be performed to shift from one speed of operation to the other speed. FIG. 4 shows a control device 432 for implementing this sequence of tasks. Usefully, control device 432 would carry out the tasks by operating a power source, inverters and shift collar actuators that are respectively similar, analogous or identical to power source 120, inverters 118 and 122 and actuators 142 and 144 of FIG. 1. For simplification, these components for system 400 are not shown.

It is anticipated that the embodiment of FIG. 4 could be usefully employed, for example, where the space or packaging in which it was to be located had significant length, and very limited diameter.

Figure 5:
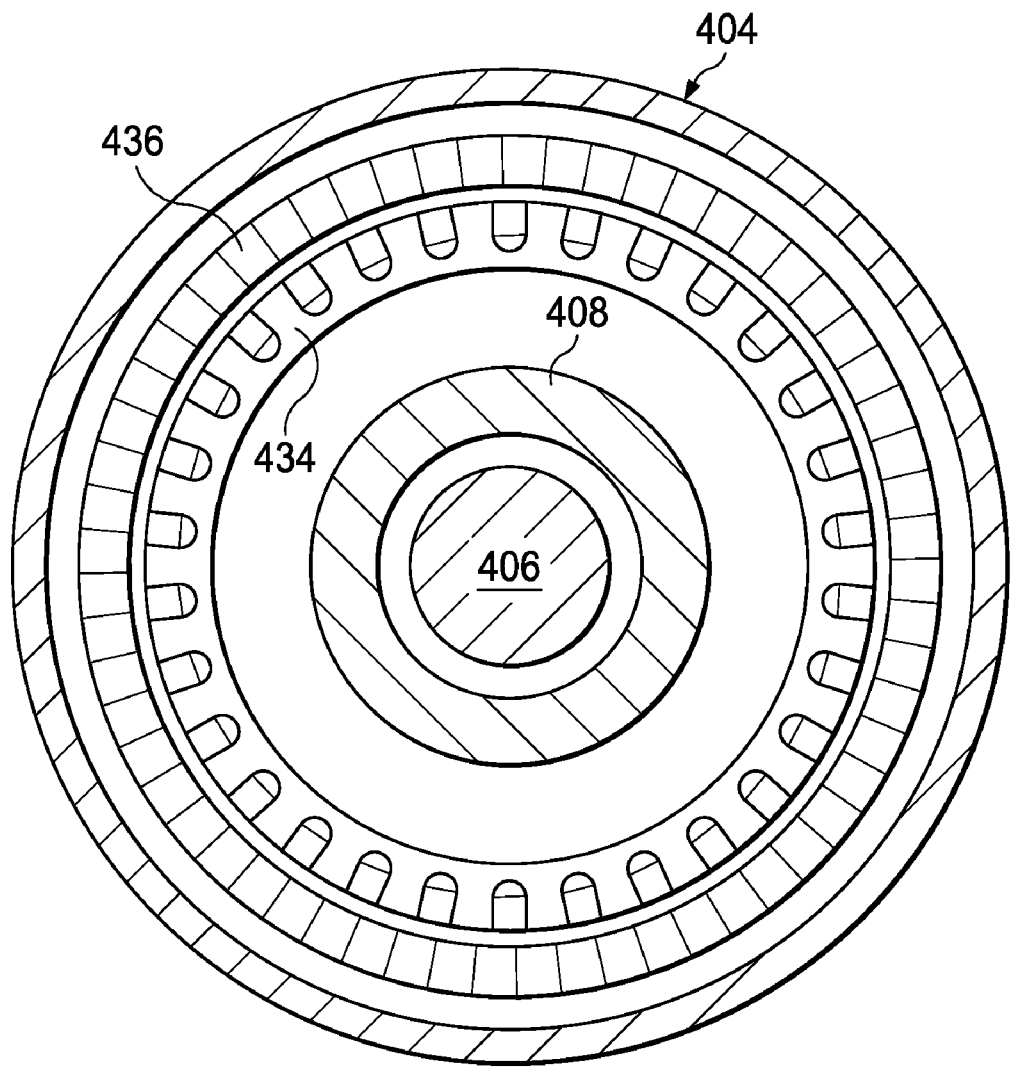
FIG. 5 is a sectional view taken along lines 5-5 of FIG. 4.

Referring to FIG. 5, there is shown the solid shaft 406 of motor 402, in coaxial relationship with tubular shaft 408 of motor 404. FIG. 5 further shows rotor 434 and stator 436 of motor 404.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. In an electro-mechanical drive system that includes a movable power output component and further includes a plurality of electric drive motors, apparatus comprising:

a first transfer mechanism that is connectable to and disconnectable from each of said motors, for transferring power from each connected motor to cause said output component to move at a first speed relative to the motor speed, comprising a first speed ratio, and to deliver power at a specified constant level when moving at said first speed ratio;

a second transfer mechanism that is connectable to and disconnectable from each of said motors, for transferring power from each connected motor to cause said output component to move at a second speed relative to the motor speed, comprising a second speed ratio, and to deliver power at said specified constant level when moving at said second speed ratio;

shift means for selectively connecting each motor to, and disconnecting each motor from, the first and second transfer mechanisms, respectively;

a source for selectively supplying electric current to each of said motors; and a control device connected to perform a set of tasks when each of said motors are simultaneously connected to the first transfer mechanism, said set of tasks comprising:

(a) disconnecting a selected one of said motors from the first transfer mechanism, while at the same time supplying increased electric current to each remaining motor, in order to maintain movement of said output component at said first speed, and delivery of power thereby at said specified constant level;

(b) bringing the speed of said selected motor to a synchronized speed associated with said second speed; and (c) responsive to said selected motor reaching said synchronized speed, connecting said selected motor to the second transfer mechanism.

2. The apparatus of claim 1, wherein:
said set of tasks (a)-(c) is performed in regard to each of said remaining motors, wherein each of the remaining motors is sequentially chosen as the selected motor in performing said set of tasks, and task (a) for at least the final motor of said sequence is modified to include supplying increased electric current to at least one motor, other than said final motor, in order to maintain movement of said output component at said second speed, and delivery of power thereby at said specified constant level.

3. The apparatus of claim 2, wherein:
after performing said set of tasks in regard to each of said remaining motors, the control device provides an equal amount of current to each motor of said plurality, to cause each of said motors to produce equal amounts of torque and to supply equal amounts of power to said second transfer mechanism.

4. The apparatus of claim 2, wherein:
after performing said set of tasks (a)-(c) in regard to each of said remaining motors, and at a time when each of said motors are simultaneously connected to the second transfer mechanism, the control device is operable to perform a set of tasks comprising:

(d) disconnecting a particular one of said motors from the second transfer mechanism, while at the same time supplying increased electric current to each of the other motors, in order to maintain movement of said output component at said second speed, and delivery of power thereby at said specified constant level;

(e) bringing the speed of said particular motor to a synchronized speed associated with said first speed;

(f) responsive to said particular motor reaching said synchronized speed, connecting said particular motor to the first transfer mechanism; and (g) performing said set of tasks (d)-(f) in regard to each of said other motors, wherein each of the other motors is sequentially chosen as the particular motor in performing said set of tasks (d)-(f), and task (d) for at least the final motor of said sequence is modified to include supplying increased electric current to at least one motor, other than said final motor, in order to maintain movement of said output component at said first speed, and delivery of power thereby at said specified constant level.

5. The apparatus of claim 1, wherein:
just prior to disconnecting said selected one of said motors from the first transfer mechanism, the control device is operable to substantially reduce the current supplied to said selected motor, in order to reduce the torque produced by said selected motor to zero.

6. The apparatus of claim 1, wherein:
each motor of said plurality has a drive shaft, and a motor is connected to and disconnected from a given transfer mechanism by respectively connecting the drive shaft of the motor to, and disconnecting the drive shaft of the motor from, the given transfer mechanism.

7. The apparatus of claim 6, wherein:
a shift collar is mounted on each of said drive shafts, between a first gear of the first transfer mechanism and a second gear of the second transfer mechanism, and the control device operates a given shift collar to selectively lock either its first gear or its second gear to the shaft of the given shift collar, for rotation therewith.

8. The apparatus of claim 7, wherein:
an actuating mechanism responsive to the control device is operable to move a given shift collar axially along its drive shaft, into engagement with its first gear, into engagement with its second gear, and to a neutral position, selectively.

9. The apparatus of claim 1, wherein:
the first speed of the first transfer mechanism is greater than or less than, selectively, the second speed of the second transfer mechanism.

10. The apparatus of claim 1, wherein:
said plurality of motors comprises either two electric drive motors or three electric drive motors, selectively.

11. The apparatus of claim 10, wherein:
said plurality of motors comprises two electric drive motors, each of said motors has a drive shaft, and the drive shafts of the two motors are aligned in coaxial relationship with each other.

12. The apparatus of claim 11, wherein:
one of said drive shafts comprises a tubular member, and the other drive shaft comprises a solid member that has a circular cross-section, and is disposed for insertion through said tubular member.

13. In an electro-mechanical drive system that includes a movable power output component and further includes a plurality of electric drive motors, a method comprising the steps of:

initially connecting each of said motors to a first transfer mechanism, wherein the first transfer mechanism is operable to transfer power from each connected motor to cause said output component to move at a first speed relative to the motor speed, comprising a first speed ratio, and to deliver power at a specified constant level when moving at said first speed ratio;

disconnecting a selected one of said motors from the first transfer mechanism, while at the same time supplying increased electric current to each remaining motor, in order to maintain movement of said output component at said first speed, and delivery of power thereby at said specified constant level;

bringing the speed of said selected motor to a synchronized speed associated with a second speed relative to the motor speed, comprising a second speed ratio; and responsive to said selected motor reaching said synchronized speed, connecting said selected motor to a second transfer mechanism, wherein the second transfer mechanism is operable to transfer power from each connected motor to cause said output component to move at said second speed ratio, and to deliver power at said specified constant level when moving at said second speed ratio.

14. The method of claim 13, wherein:

a group of steps comprising said disconnecting, bringing to synchronous speed, and subsequent connecting steps is performed in regard to each of said remaining motors, wherein each of the remaining motors is sequentially chosen as the selected motor in performing said group of steps, and said disconnecting step for at least the final motor of said sequence is modified to include supplying increased electric current to at least one motor, other than said final motor, in order to maintain movement of said output component at said second speed, and delivery of power thereby at said specified constant level.

15. The method of claim 14, wherein:

responsive to each of the remaining motors being connected to the second transfer mechanism, an equal amount of current is provided to each motor of said plurality, to cause each of said motors to produce equal amounts of torque and to supply equal amounts of power to said second transfer mechanism.

16. The method of claim 13, wherein:

just prior to disconnecting said selected one of said motors from the first transfer mechanism, the current supplied to said selected motor is substantially reduced, in order to reduce the torque produced by said selected motor to zero.

17. The method of claim 13, wherein:

each motor of said plurality has a given drive shaft, and a motor is connected to and disconnected from a transfer mechanism by respectively connecting the drive shaft of the motor to, and disconnecting the drive shaft of the motor from, the given transfer mechanism.

18. The method of claim 17, wherein:

a shift collar is mounted on each of said drive shafts, between a first gear of the first transfer mechanism and a second gear of the second transfer mechanism, and a given shift collar is operated to selectively lock either its first gear or its second gear to the shaft of the given shift collar, for rotation therewith.

19. The method of claim 18, wherein:

an actuating mechanism responsive to the control device is operated to move a given shift collar axially along its drive shaft, into engagement with its first gear, into engagement with its second gear, and to a neutral position, selectively.

20. The method of claim 13, wherein:

the first speed of the first transfer mechanism is greater than or less than, selectively, the second speed of the second transfer mechanism.

\* \* \* \* \*